United States Patent
Kim

(10) Patent No.: US 9,774,734 B2
(45) Date of Patent: Sep. 26, 2017

(54) CAR EMERGENCY SYSTEM AND METHOD OF EMERGENCY MEASURES USING THE CAR EMERGENCY SYSTEM

(71) Applicant: HYUNDAI MOTOR COMPANY, Seoul (KR)

(72) Inventor: Min Cheol Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/949,030

(22) Filed: Nov. 23, 2015

(65) Prior Publication Data

US 2016/0150083 A1    May 26, 2016

(30) Foreign Application Priority Data

Nov. 24, 2014  (KR) .................. 10-2014-0164257

(51) Int. Cl.
| | | |
|---|---|---|
| *B60Q 1/00* | (2006.01) | |
| *H04M 3/51* | (2006.01) | |
| *G08B 25/01* | (2006.01) | |
| *G08B 25/08* | (2006.01) | |
| *B60R 21/00* | (2006.01) | |

(52) U.S. Cl.
CPC ......... *H04M 3/5116* (2013.01); *G08B 25/016* (2013.01); *G08B 25/08* (2013.01); *B60R 2021/0027* (2013.01)

(58) Field of Classification Search
None
See application file for complete search history.

(56) References Cited

U.S. PATENT DOCUMENTS

| 2009/0221262 A1 | 9/2009 | Miwa et al. | |
|---|---|---|---|
| 2011/0039538 A1* | 2/2011 | Madhavan | H04W 76/027 455/422.1 |
| 2012/0258725 A1* | 10/2012 | Yi | H04W 4/001 455/456.1 |
| 2014/0295885 A1* | 10/2014 | Marko | H04W 4/02 455/456.1 |

FOREIGN PATENT DOCUMENTS

| JP | 2003-187361 A | 7/2003 |
|---|---|---|
| JP | 2008-098706 A | 4/2008 |

(Continued)

OTHER PUBLICATIONS

Korean Notice of Allowance issued in Application No. 10-2014-0164257 dated Feb. 7, 2017, with partial English translation.

*Primary Examiner* — Adolf Dsouza
(74) *Attorney, Agent, or Firm* — McDermott Will & Emery LLP

(57) ABSTRACT

A vehicle emergency system includes an accident detection unit for detecting a collision strength to generate an accident signal, a telematics unit for generating a flag signal in response to the accident signal and for storing the flag signal, and a call center server for recognizing an emergency situation when the flag signal is delivered, and for executing an emergency procedure after emergency call, in which the telematics unit, even when reset by the accident signal, checks the flag signal stored before reset, and automatically transmits at least one of the flag signal and an accident message generated based on the flag signal into the call center server.

18 Claims, 3 Drawing Sheets

(56) References Cited

FOREIGN PATENT DOCUMENTS

| | | |
|---|---|---|
| JP | 2014-021958 A | 2/2014 |
| KR | 2000-0008506 A | 2/2000 |
| KR | 10-2005-0032345 A | 4/2005 |
| KR | 10-2005-0076513 A | 7/2005 |
| KR | 10-2006-0006488 A | 1/2006 |
| KR | 10-2006-0016454 A | 2/2006 |
| KR | 10-1010124 B1 | 1/2011 |
| KR | 10-1232486 B1 | 2/2013 |
| KR | 10-2014-0055818 A | 5/2014 |

* cited by examiner

CAR EMERGENCY SYSTEM AND METHOD OF EMERGENCY MEASURES USING THE CAR EMERGENCY SYSTEM

CROSS-REFERENCE TO RELATED APPLICATION

This application claims the benefit of priority to Korean Patent Application No. 10-2014-0164257, filed on Nov. 24, 2014 with the Korean Intellectual Property Office, the disclosure of which is hereby incorporated by reference as if fully set forth herein.

TECHNICAL FIELD

The disclosure relates to a method and a system for car emergency, and more particularly to a system, emergency system and method, adapted in a vehicle, operable to detect an emergency situation when the vehicle is involved in an accident and to handle an emergency measure service.

BACKGROUND

Generally, an automobile accident causes damage or human life. Procedures and costs to determine the cause of the accident, and to deal with the aftermath, may become complicated.

For example, the procedures and the costs may be difficult to determine because no eye witness exists or all drivers and passengers have passed away after the accident.

To solve the above-described issues, on a telematics device in a vehicle, an emergency handling apparatus capable of detecting an automobile accident and automatically connecting to a call emergency center has been installed.

However, since it occasionally occurs that the telematics device is reset by detecting the automobile accident, the emergency handing apparatus cannot properly operate. Accordingly, it is a problem that the procedures to determine the cause of the accident, and to deal with the aftermath, may not address.

SUMMARY OF THE DISCLOSURE

Embodiments of the disclosure can be directed to a system, an emergency handling method and an emergency handling apparatus operable to turn on an emergency call unit included in a telematics device in order to automatically inform the status into a call emergency center, even when the telematics device is reset by an impact or a contact caused by automobile accident such as collision or crash.

A vehicle emergency system can include an accident detection unit configured to detect collision strength to generate an accident signal. Engaged with the accident detection unit, a telematics unit can generate a flag signal in response to the accident signal and to store the flag signal. A call center server, engaging with the telematics unit, can recognize an emergency situation when the flag signal is delivered, or configured to execute an emergency procedure after emergency call. Even when reset by the accident signal, the telematics unit checks the flag signal stored before reset, and automatically transmits at least one of the flag signal and an accident message generated based on the flag signal into the call center server.

The accident detection unit can include at least one of an airbag sensor, an impact sensor and an acceleration sensor for sensing the collision strength.

The telematics unit further includes a non-volatile memory configured to store at least one of the flag signal and the accident message.

The telematics unit automatically transmits, into the call center server, at least one of the flag signal containing a flag state for emergency call and the accident message containing location of accident, time, and a type of fuel.

The telematics unit, if rebooting when reset, automatically transmits at least one of the flag signal and the accident message into the call center server at the timing of rebooting.

An emergency handling method for vehicle emergency system can include the step, performed at an accident detection unit, of detecting collision strength to generate an accident signal. At a telematics unit, a flag signal can be generated in response to the accident signal and storing the flag signal. At a call center server, an emergency situation can be recognized when the flag signal is delivered, or running an emergency procedure after emergency call. Further, even when reset by the accident signal, the flag signal stored before reset can be checked or confirmed to automatically transmit at least one of the flag signal and an accident message generated based on the flag signal into the call center server.

At the accident detection unit, at least one of an airbag sensor, an impact sensor and an acceleration sensor for sensing the collision strength can be used.

At least one of the flag signal and the accident message can be stored in a non-volatile memory.

At least one of the flag signal containing a flag state for emergency call and the accident message containing location of accident, time, and a type of fuel can be automatically transmitted from the telematics unit into the call center server.

If the telematics unit is rebooted after reset, at least one of the flag signal and the accident message can be automatically transmitted into the call center server in response to rebooting.

A telematics terminal can include an accident signal receiver configured to receive an accident signal generated from an accident detection unit sensing collision strength. Engaged with the accident signal receiver, a flag signal generator can generate a flag signal in response to the accident signal and to store the flag signal. Even when a reset is occurred in response to the accident signal, a flag signal confirmation unit can check or confirm the flag signal stored before the reset. Engaging with flag signal confirmation unit, the signal transmitter can automatically transmit at least one of the flag signal and an accident message generated based on the flag signal into the call center server.

The accident signal receiver can receive the accident signal regarding the collision strength from an airbag.

At least one of the flag signal and the accident message can be stored in a non-volatile memory.

The non-volatile memory can store at least one of the flag signal containing a flag state for emergency call and the accident message containing location of accident, time, and a type of fuel.

If a rebooting is occurred by the reset, the flag signal confirmation unit can check the stored flag signal in response to the rebooting.

The signal transmitter can transmit the checked flag signal into the call center server according to the flag state or the rebooting.

In an emergency handling method for vehicle emergency system, an accident signal generated from an accident detection unit sensing an impact or collision strength can be delivered at an accident signal receiver. At a flag signal generator, a flag signal in response to the accident signal can be generated and stored. At a flag signal confirmation unit, even when a reset is occurred in response to the accident signal, the flag signal stored before the reset can be confirmed or checked. At a signal transmitter, at least one of the flag signal and an accident message generated based on the flag signal can be automatically transmitted into the call center server At least one of the flag signal containing a flag state for emergency call and the accident message containing location of accident, time, and a type of fuel can be stored in a non-volatile memory.

When a rebooting is occurred by the reset, at least one of the flag signal and the accident message stored in the flag signal generator can be checked by the flag signal confirmation unit in response to rebooting.

The flag signal checked according to the flag state or the rebooting can be transmitted from the signal transmitter into the call center server.

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
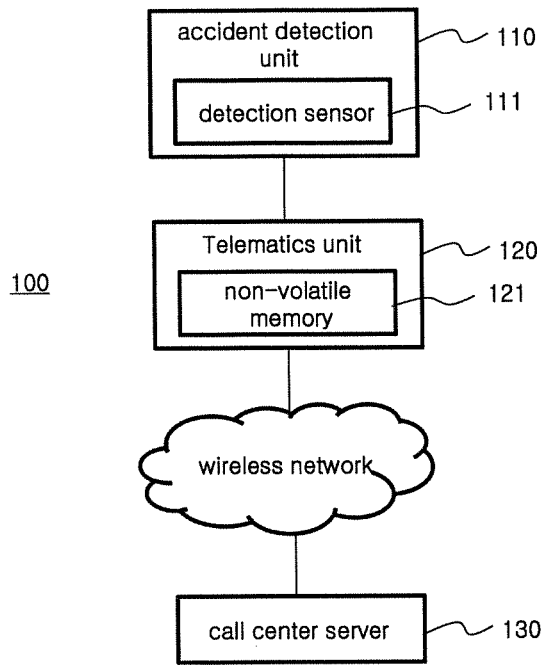
FIG. 1 shows a vehicle emergency system.

Reference will now be made in detail to the preferred embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

Also, in the description of embodiments, terms such as first, second, A, B, (a), (b) or the like may be used herein when describing components of the present disclosure. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the present disclosure are encompassed in the disclosure.

FIG. 1 shows a vehicle emergency system.

As shown, the vehicle emergency system 100 may include an accident detection unit 110, a telematics unit 120, and a call center 130, in order to quickly handle an automobile accident.

First, the accident detection unit 100 may include at least one of a detection sensor 111 for sensing a collision or collision strength. In vehicle operation, the detection sensor 111 can sense a collision with another vehicle or object and generate an accident signal. Accordingly, the accident detection unit 110 can output the accident signal generated from the detection sensor 111.

By way of example but not limitation, the accident detection unit 110 can include an airbag sensor, an impact sensor, or an acceleration sensor, for detecting an airbag's impact or impact strength. Further, the accident detection unit 110 can include any sensor capable of detecting collision, collision strength, impact, or impact strength.

The telematics unit 120 receives the accident signal generated from the accident detection unit 110, and generates a flag signal in response to a received accident signal to store the flag signal.

Herein, the flag signal can be stored in a non-volatile memory 121. Accordingly, the flag signal stored in the non-volatile memory 121 is not deleted. The flag signal stored in the non-volatile memory 121 can include a flag state for emergency call.

Further, the telematics unit 120 can generate an accident message based on the generated flag signal. The accident message is a kind of information collected by the telematics unit 120 in response to the flag signal. The accident message can include a location of an accident, time and a type of fuel used in the vehicle, among other data points. The accident message can be stored in the non-volatile memory 121.

When the vehicle collides with another object or vehicle, the telematics unit 120 can be reset in response to the accident signal, or rebooted according to a reset procedure.

If a reset occurs, the telematics unit 120 can check the flag signal stored in the non-volatile memory 121 in order to automatically transfer the flag signal and/or the accident message stored in the non-volatile memory 121 into the call center server 130. Or, on or after reboot followed by reset, the telematics unit 120 can check the flag signal and/or the accident message stored in the non-volatile memory 121 to transmit them into the call center server 130.

The call center server 130, receiving the flag signal from the telematics unit 120, can recognize an emergency situation to report it to a manager, and try to connect an emergency call with the telematics unit 120. Or, the call center server 130 can run an emergency procedure when receiving the flag signal and/or the accident message.

The call center server 130 can precede an emergency call with the telematics unit 120 in response to the flag signal and/or the accident message, and handle or perform plural emergency actions after the emergency call in order to provide an accident sequence analysis regarding a vehicle after the automobile accident.

Figure 2:
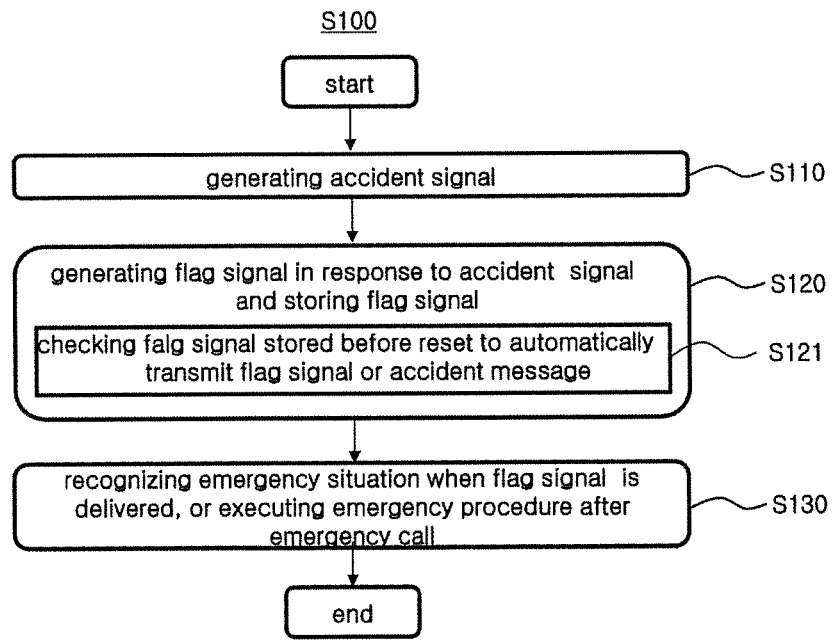
FIGS. 2 and 3 are flowcharts describing an emergency handling method in the vehicle emergency system.
Figure 3:
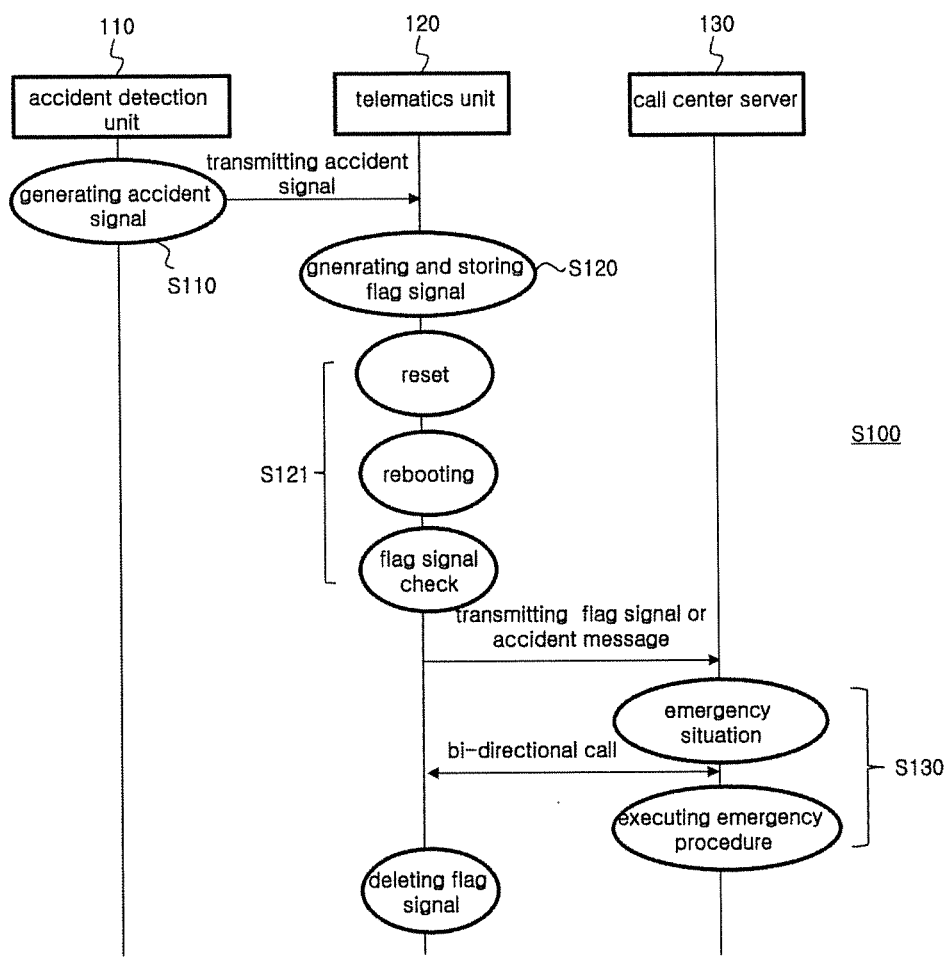

FIGS. 2 and 3 are flowcharts describing an emergency handling method in the vehicle emergency system.

As shown, the emergency handling method S100 for use in the vehicle emergency system 100 can include following steps S110, S120, S121, S130 in order to quickly handle an automobile accident.

In the step of S110, the detection sensor 111 included in the accident detection unit 110 can be used to sense an impact or a collision strength and generate the accident signal. When the accident signal is generated, the accident detection unit 110 can output the accident signal generated from the detection sensor 111.

In the step of S120, the accident signal generated in the step of S110 can be delivered into the telematics unit 120. In response to the accident signal, the flag signal can be generated by the telematics unit 120.

The generated flag signal can be stored in the non-volatile memory 121. The flag signal stored in the non-volatile memory 121 can include the flag state for emergency call.

In the step of S120, the accident message can be generated based on the flag signal. The accident message can include information collected by the telematics unit 120 in response to the flag signal. By way of example but not limitation, the accident message can include a location of an accident, time and a type of fuel used in the vehicle, among other data points. The accident message can be stored in the non-volatile memory 121.

In the step of S120, if the vehicle collides with another object or vehicle, a reset in response to the accident signal can occur in the telematics unit 120, or a rebooting according to a reset procedure can occur (S121).

If a reset occurs in the step of S120, the telematics unit 120 can check the flag signal stored in the non-volatile memory 121 in order to automatically transfer the flag signal and/or the accident message stored in the non-volatile memory 121 into the call center server 130. Further, on or after reboot followed by reset, the telematics unit 120 can check the flag signal and/or the accident message stored in the non-volatile memory 121 to transmit them into the call center server 130.

In the step of S130, when the call center server 130 receives the flag signal from the telematics unit 120, the call center server 130 can recognize an emergency situation to report it to a manager, and try to connect an emergency call with the telematics unit 120.

Further, in the step of S130, when the flag signal and/or the accident message is delivered from the telematics unit 120, the call center server 130 can run an emergency procedure after the emergency call between the telematics unit 120 and the call center server 130.

In the step of S130, the emergency call between the telematics unit 120 and the call center server 130 can be achieved in response to the flag signal and/or the accident message. Further, at the call center server 130, plural emergency actions can be performed after the emergency call in order to provide an accident sequence analysis regarding a vehicle after the automobile accident.

At that time, if the telematics unit 120 is connected with the call center server 130 via the emergency call (bi-directional call), the telematics unit 120 can delete the stored flag signal. This deletion is for overcoming a boundary of capacity in the nonvolatile memory 121.

Figure 4:
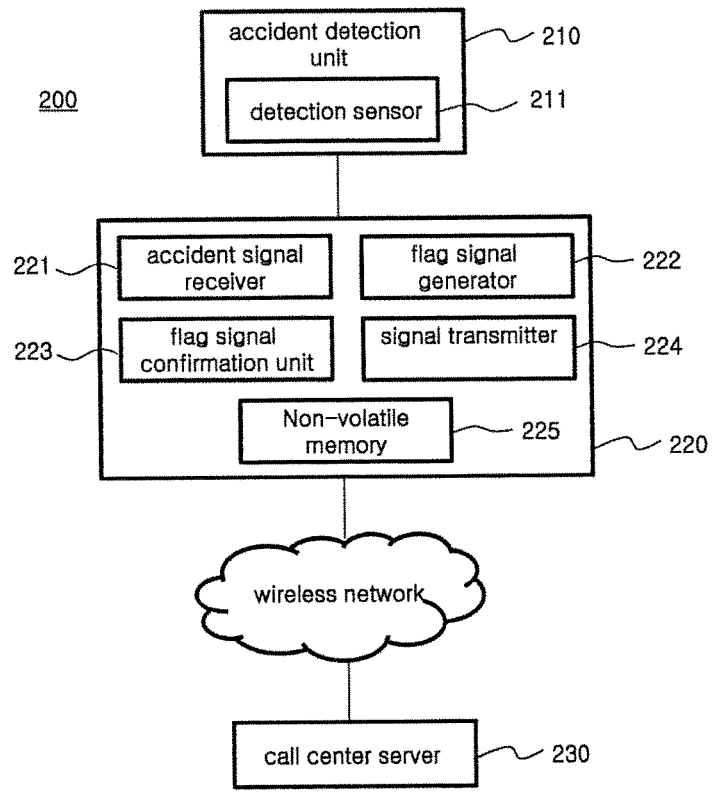
FIG. 4 shows a vehicle emergency system.

FIG. 4 shows a vehicle emergency system.

As shown, the vehicle emergency system 200 may include an accident detection unit 210, a telematics unit 220, and a call center 230, in order to quickly handle an automobile accident. The telematics unit 200 may include an accident detection unit 210, a flag signal generator 222, a flag signal confirmation unit 223, and a signal transmitter 224. Hereinafter, the telematics unit 220 is described in detail.

The accident detection unit 221 can receive the accident signal generated from the accident detection unit 210 which senses an impact or collision strength. Herein, in order to sense an impact or collision strength, the accident detection unit 210 can include at least one of a detection sensor 211.

By way of example but not limitation, the accident detection unit 210 can include an airbag sensor, an impact sensor, or an acceleration sensor, for detecting an airbag's impact or impact strength. Further, the accident detection unit 210 can include any sensor capable of detecting a collision, collision strength, an impact, or impact strength.

The detection sensor 211 can sense a crash or a collision with another vehicle or object while a vehicle operates and generate an accident signal. Accordingly, after the detection sensor 211 generates the accident signal, the accident detection unit 210 can transmit the accident signal to the accident signal receiver 211.

The flag signal generator 222 generates the flag signal in response to the accident signal received by the accident signal receiver 211. At this time, the flag signal can be stored in the non-volatile memory 225.

Accordingly, the flag signal stored in the non-volatile memory 225 can be not deleted. The flag signal stored in the non-volatile memory 225 can include a flag state for emergency call.

The flag signal confirmation unit 223 can check the flag signal stored in the non-volatile memory 225 even when a reset occurs in response to the accident signal delivered in the flag signal generator 222.

If the reset occurs, a rebooting can be automatically performed. In this case, on or after reboot followed by reset, the flag signal confirmation unit 223 can check the flag signal stored in the non-volatile memory 225.

The signal transmitter 224 can automatically transfer the flag signal confirmed by the flag signal confirmation unit 223 or the accident message generated based on the flag signal into the call center server 230 through a wireless network.

The accident message can be stored in the non-volatile memory 225. The accident message stored in the non-volatile memory 225 is a type of information collected by the telematics unit 220. The accident message can include a location of an accident, time and a type of fuel used in the vehicle, among other data points.

The flag signal and/or the accident message confirmed in response to the flag state or rebooting can be transferred to the call center server 230 via a wireless network. The wireless network can include a mobile radio communication network.

The call center server 230, receiving the flag signal and/or the accident message from the telematics unit 220, can recognize an emergency situation to report it to a manager, and try to connect an emergency call with the telematics unit 220. Or, the call center server 230 can run an emergency procedure when receiving the flag signal and/or the accident message from the telematics unit 220.

The call center server 230 can precede an emergency call with the telematics unit 220 in response to the flag signal and/or the accident message, and handle or perform plural emergency actions after the emergency call in order to provide an accident sequence analysis regarding a vehicle after the automobile accident.

Figure 5:
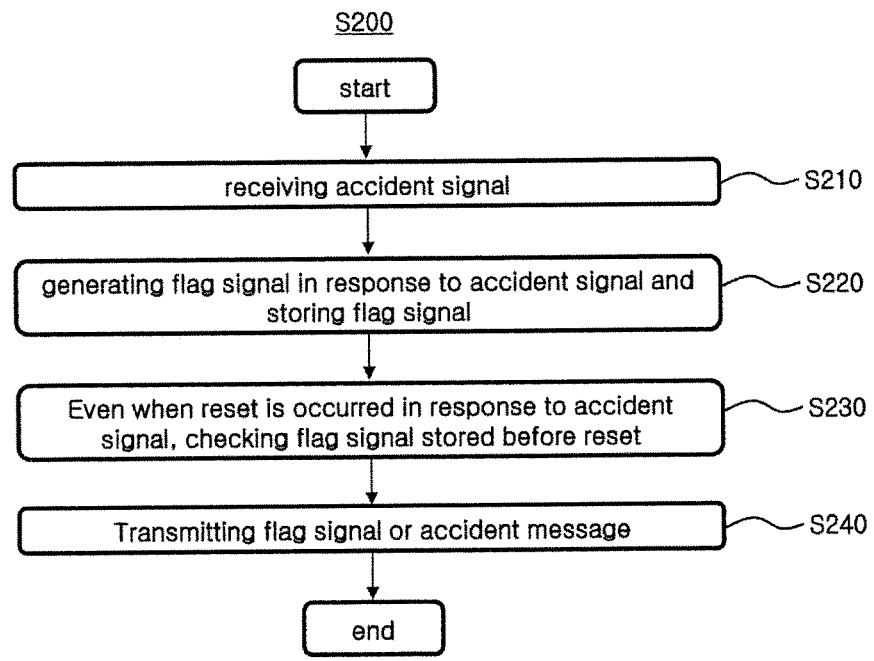
FIG. 5 is a flowchart describing an emergency handling method in the vehicle emergency system.

FIG. 5 is a flowchart describing an emergency handling method in the vehicle emergency system.

As shown, the emergency handling method S200 for use in the vehicle emergency system 200 can include following steps S210, S220, S230, S240 in order to quickly handle an automobile accident.

In the step of S210, the accident signal generated from the accident detection unit 210 sensing an impact or collision strength is delivered at the accident signal receiver 221.

In the step of S220, the flag signal is generated by the flag signal generator 222 in response to the accident signal received by the accident signal receiver 221. Herein, the generated flag signal can be stored in the non-volatile memory 225.

Accordingly, the flag signal stored in the non-volatile memory 225 can be not deleted. The flag signal stored in the non-volatile memory 225 can include the flag state for emergency call.

In the step of S230, even if a reset occurs in response to the accident signal generated by the flag signal generator 222, the flag signal stored in the non-volatile memory 225 can be checked by the flag signal confirmation unit 223.

If a reset occurs, a rebooting can be automatically performed. In the step of S230, when a rebooting occurs by a reset, the flag signal stored in the non-volatile memory 225 can be confirmed by the flag signal confirmation unit 223.

In the step of S240, the flag signal confirmed in the step of S230 or the accident message generated based on the flag signal can be automatically transmitted from the signal transmitter 224 to the call center server 230 via the wireless network.

Herein, the accident message can be stored in the non-volatile memory 225. The accident message can include information collected by the telematics unit 220 in response to the flag signal. By way of example but not limitation, the accident message can include a location of an accident, time and a type of fuel used in the vehicle.

The flag signal checked in response to the flag state or rebooting and/or the accident message generated based on the flag signal can be transmitted to the call center server 230 by the signal transmitter 224 via the wireless network. The wireless network can include a mobile radio communication network.

When the flag signal and/or the accident message is delivered at the call center server 230 from the telematics unit 220, the call center server 130 can recognize an emergency situation to report it to a manager, and try to connect an emergency call between the call center server 130 and the telematics unit 220.

Further, when the flag signal and/or the accident message is delivered at the call center server 230 from the telematics unit 220, the call center server 130 can execute an emergency procedure after the emergency call between the telematics unit 220 and the call center server 230.

In response to the flag signal and/or the accident message, the emergency call between the telematics unit 120 and the call center server 130 can be achieved. Further, at the call center server 130, plural emergency actions can be performed after the emergency call in order to provide an accident sequence analysis regarding a vehicle after the automobile accident.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A vehicle emergency system comprising:
   an accident detection unit for detecting a collision strength to generate an accident signal;
   a telematics unit for generating a flag signal in response to the accident signal and for storing the flag signal; and
   a call center server for recognizing an emergency situation when the flag signal is delivered, and for executing an emergency procedure after emergency call,
   wherein the telematics unit, when reset by an impact caused by an accident, checks, at a timing of rebooting due to the reset, whether the flag signal according to the accident signal is stored, and automatically transmits at least one of the flag signal and an accident message generated based on the flag signal to the call center server when the stored flag signal is checked.

2. The vehicle emergency system according to claim 1, wherein the accident detection unit includes at least one of an airbag sensor, an impact sensor and an acceleration sensor for sensing the collision strength.

3. The vehicle emergency system according to claim 1, wherein the telematics unit further includes a non-volatile memory for storing at least one of the flag signal and the accident message.

4. The vehicle emergency system according to claim 3, wherein the telematics unit automatically transmits, into the call center server, at least one of the flag signal containing a flag state for emergency call and the accident message containing a location of an accident, time, and a type of fuel.

5. An emergency handling method for a vehicle emergency system, the emergency handling method comprising:
step (a), of at an accident detection unit, detecting a collision strength to generate an accident signal;
step (b), of at a telematics unit, generating a flag signal in response to the accident signal and storing the flag signal; and
step (c), of at a call center server, recognizing an emergency situation when the flag signal is delivered, and running an emergency procedure after emergency call,
wherein, the step of (b) includes, when reset by an impact caused by an accident, checking, at a timing of rebooting due to the reset, whether the flag signal according to the accident signal is stored to automatically transmit at least one of the flag signal and an accident message generated based on the flag signal to the call center server when the stored flag signal is checked.

6. The emergency handling method according to claim 5, wherein the step of (a) includes, at the accident detection unit, using at least one of an airbag sensor, an impact sensor and an acceleration sensor for sensing the collision strength.

7. The emergency handling method according to claim 6, wherein, in the step of (b), at least one of the flag signal and the accident message is stored in a non-volatile memory.

8. The emergency handling method according to claim 6, wherein, in the step of (b), at least one of the flag signal containing a flag state for emergency call and the accident message containing a location of an accident, time, and a type of fuel is automatically transmitted from the telematics unit into the call center server.

9. A telematics terminal comprising:
an accident signal receiver for receiving an accident signal generated from an accident detection unit sensing a collision strength;
a flag signal generator for generating a flag signal in response to the accident signal and storing the flag signal;
a flag signal confirmation unit for, when a reset occurs in response to an impact caused by an accident, checking, at a timing of rebooting due to the reset, whether the flag signal according to the accident signal is stored; and
a signal transmitter for automatically transmitting at least one of the flag signal and an accident message generated based on the flag signal to the call center server when the stored flag signal is checked.

10. The telematics terminal according to claim 9, wherein the accident signal receiver receives the accident signal regarding the collision strength from an airbag.

11. The telematics terminal according to claim 10, wherein at least one of the flag signal and the accident message is stored in a non-volatile memory.

12. The telematics terminal according to claim 10, wherein the non-volatile memory stores at least one of the flag signal containing a flag state for emergency call and the accident message containing a location of an accident, time, and a type of fuel.

13. The telematics terminal according to claim 12, wherein the flag signal confirmation unit, if a rebooting occurs by the reset, checks the stored flag signal in response to the rebooting.

14. The telematics terminal according to claim 12, wherein the signal transmitter transmits the checked flag signal into the call center server according to the flag state or the rebooting.

15. An emergency handling method for a vehicle emergency system, the emergency handling method comprising:
step (a), of at an accident signal receiver, receiving an accident signal generated from an accident detection unit sensing a collision strength;
step (b), of at a flag signal generator, generating a flag signal in response to the accident signal and storing the flag signal;
step (c), of at a flag signal confirmation unit, when a reset occurs in response to an impact caused by an accident, checking, at a timing of rebooting due to the reset, whether the flag signal according to the accident signal is stored; and
step (d), of at a signal transmitter, automatically transmitting at least one of the flag signal and an accident message generated based on the flag signal to the call center server when the stored flag signal is checked.

16. The emergency handling method according to claim 15, wherein, in the step of (b), at least one of the flag signal containing a flag state for emergency call and the accident message containing a location of an accident, time, and a type of fuel is stored in a non-volatile memory.

17. The emergency handling method according to claim 15, wherein, in the step of (c), when a rebooting occurs by the reset, at least one of the flag signal and the accident message stored in the flag signal generator is checked by the flag signal confirmation unit in response to rebooting.

18. The emergency handling method according to claim 15, wherein, in the step of (d), the flag signal checked according to the flag state or the rebooting is transmitted from the signal transmitter into the call center server.

* * * * *